Figure 3:
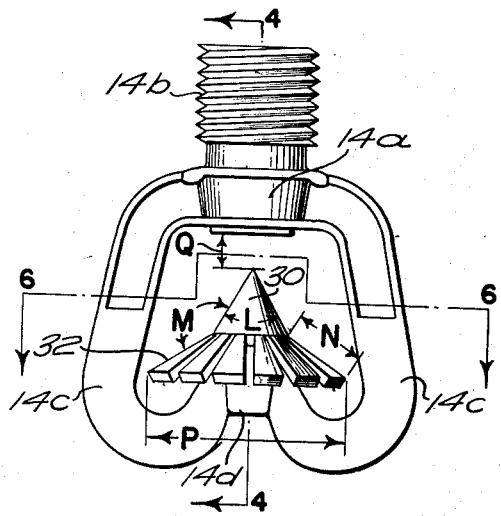
Figure 4:
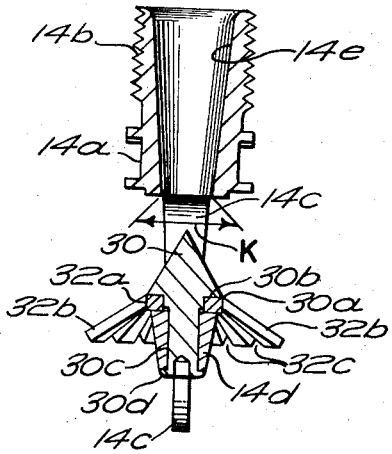

Aug. 24, 1954    R. A. CRANSTON    2,687,180
METHOD OF EXTINGUISHING BURNING FLAMMABLE VAPORS
Filed Dec. 31, 1952    2 Sheets-Sheet 2

INVENTOR:
ROBERT A. CRANSTON, DECEASED
BY MARGARET S. CRANSTON, ADMINISTRATRIX
BY
David D. McKenney
ATTORNEY Patented Aug. 24, 1954

2,687,180

UNITED STATES PATENT OFFICE 2,687,180

METHOD OF EXTINGUISHING BURNING FLAMMABLE VAPORS

Robert A. Cranston, deceased, late of Cranston, R. I., by Margaret S. Cranston, administratrix, Cranston, R. I., assignor to Grinnell Corporation, Providence, R. I., a corporation of Delaware Application December 31, 1952, Serial No. 328,934

3 Claims. (Cl. 169—1)

This invention relates to an improved method of extinguishing burning flammable vapors. More especially it has to do with the formation of a myriad of individual, non-cohesive air-filled globules or water bubbles and directing them through the flames and flammable vapors onto the surface of the flammable liquid so that the water film of the globules will be vaporized and thereby effect the dilution of the flammable vapors by the addition of the water vapor to such an extent that the resulting mixture of vapors will not burn.

This present application is a continuation-in-part of inventor's prior application, Serial No. 670,151, filed May 16, 1946, now abandoned.

So-called flammable liquids are not flammable as long as they remain in the liquid state, and although practically all of them vaporize—some very easily and rapidly at normal room temperatures, others reluctantly and slowly at such temperatures—their concentrated flammable vapors near the surface of the liquids are themselves not burnable. Not until and unless a flammable vapor is mixed with sufficient oxygen from the air to support combustion does any burning take place. Then follows what is fundamentally a vapor phase oxidation reaction.

This reaction takes place between the flammable vapor and the oxygen in the presence of heat. The reaction liberates thermal energy which heats the liquid, thereby causing it to vaporize more rapidly, then heats the vapor which thereupon reacts with oxygen to liberate more thermal energy, and thus the reaction becomes self-propagating. To stop this reaction the liberated molecules of flammable vapor must be prevented from coming into contact with the molecules of oxygen in the presence of heat. One way of doing this is known as "smothering." This involves the formation of a blanket at the surface of the liquid so as to prevent the flammable vapors from reaching the oxygen. Such a blanket can be formed from heavy inert gas like carbon dioxide, or from sand, or foam. The formation of such a blanket simultaneously absorbs some of the radiant heat of the flames thus greatly reducing the essential element of heat in the vapor phase oxidation reaction. This suggests another method, called "cooling," which involves sufficient removal of heat to stop the reaction. Since thermal energy is necessary to vaporize the flammable liquid and heat this vapor sufficiently to produce a vapor phase reaction, the latter will cease if sufficient heat is removed.

A third method, and the one followed by the present invention, involves the admixture of a non-flammable and non-oxidizable vapor to the flammable vapor. Such a non-flammable and non-oxidizable vapor may be termed a light inert gas. For example, water vapor may be considered such a light inert gas under most conditions of temperature and pressure and when added in sufficient quantity to a flammable vapor will produce a mixture of vapors that is non-flammable even in the presence of combustion supporting oxygen.

The basic mechanics of this dilution method are quite simple, although an exacting treatment of all phases of the subject is a science in itself. For the present purposes, consider any given volume in which two dissimilar types of particles move at random. When any one type of particle collides with a particle of the other type a reaction occurs. This liberates heat which in turn increases the speed of the random motion and causes more such collisions to occur in any given time. If now there is introduced into this given volume a third type of particle whose collision with any other type of particle results in no energy gain, it follows that the number of heat liberating collisions is bound to be reduced, the reaction will be slowed up and, if the quantity of the third type of particles is sufficient, the reaction can to all intents and purposes be stopped.

The three different types of particles just discussed may be regarded as molecules of flammable vapor, oxygen, and a light inert gas such as water vapor. Propagation of flame requires a certain minimum number of collisions per unit of time between the flammable vapor molecules and the oxygen molecules. A molecule of a light inert gas has greater mobility than a molecule of flammable vapor or a molecule of oxygen and therefore it can move about faster and effect more collisions with the other molecules than they can make with themselves. By introducing a sufficient quantity of water vapor molecules, whose collisions with the other kinds of molecules result in no energy gain, the number of collisions between the flammable vapor molecules and the oxygen molecules can be reduced to below the minimum number of such collisions necessary to maintain the flame. As a result the fire will be extinguished.

Since water in the liquid state is heavier than most so-called flammable liquids, the problem of employing it in extinguishing burning vapors from such liquids involves the retention of the water at the surface of the liquid long enough for it to be vaporized by the radiant heat of the flames and mix with the flammable vapors. In Venturi bore 18a leading from its top inlet 18b to its discharge outlet 18c and at the neck of this bore is a side inlet 18d for the surface tension reducing agent. As the water flows through the Venturi bore the reduced pressure at the neck causes the surface tension reducing agent to flow into the fitting and be mixed with the water. By proper sizing of the bore 18a and the side inlet 18d, together with the correct positioning of the pipe 28 below the side inlet, the quantity of surface tension reducing agent introduced to the water stream can be proportioned as desired. As previously stated a proportion of one part of a surface tension reducing agent to ninety-nine parts of water has been found satisfactory for the production of the desired bubbles.

The mixture of water and agent proceeds from the proportioning fitting 18 to the projector 14 by which the mixture is transformed into thin films of liquid which upon leaving the projector and encountering the air above the tank break up into a myriad of individual air filled globules of water or bubbles which are projected through the flames of the burning vapor originating from the flammable liquid in the tank.

The projector has a body 14a whose nipple section 14b is screwed into the coupling 16. From the body one or more arms 14c extend downward to a bottom hub 14d located around the axis of the projector opposite its throat 14e. As shown, this throat (see Fig. 3) is converging toward its outlet but it could be a straight throat if desired.

Mounted on the hub 14d is a conical transformer 30 and a distributor 32. The transformer is shown as a true cone but it can be variously shaped so long as it smoothly transforms a solid stream issuing from the throat 14e into an annular stream which proceeds along the surface of the transformer to its perimeter 30a.

The distributor 32 is a plate having an annular central circular portion 32a clamped between a shoulder 30b on the transformer and the upper edge of the hub 14d. A stem 30c of said transformer extends through the hole of the hub and is headed over at 30d onto the lower edge of the hub 14d to secure the transformer, distributor and hub securely together. Projecting from the central portion 32a of the distributor are a series of segmental sections 32b which may be disposed perpendicularly or at various angles to the axis of the distributor depending upon the characteristics of the discharge desired.

Between the segmental sections 32b of the distributor are narrow slots 32c of substantially uniform width which extend from the perimeter 30a of the transformer to the outer perimeter of the distributor.

As a liquid issues from the outlet of the throat 14e as a smooth solid stream it promptly encounters the point and diverging surface of the conical transformer 30 before the stream has time to scatter. As the compact solid stream moves over the enlarging surface of the transformer it is transformed into an annular stream which becomes thinner as it nears the distributor 32. In addition, the direction of flow of the annular stream is altered so that as it reaches the perimeter 30a of the transformer it is directed onto the distributor with no spattering impact or rebound therefrom. Portions of the thinning annular stream continue along the surfaces of the segmental sections 32b of the distributor, each portion spreading and thinning out still more as it moves farther away from the axis of the projector and the surface area of each segmental section becomes greater. These portions of the liquid leave the outer circular edges of the segments as very thin films which for the most part break up into air-filled bubbles. These are projected downward over an annular area of the flammable liquid with substantial uniformity of coverage.

Simultaneously the remaining portions of the annular stream leaving the transformer 30 pass into the narrow slots 32c and emerge therefrom as thin films which likewise for the most part break up into air-filled bubbles. It appears from close observation and distribution tests that as the liquid enters a slot it seems to move outward as well as along the axis of the projector, being augmented possibly by some of the liquid near the radial edges of the segments, and its rate of discharge through a slot seems to increase from the perimeter of the conical transformer to the outer perimeter of the distributor. The result is that the bubbles from the liquid flowing through each slot covers a sort of segmental area of the surface of the flammable liquid. These segmental areas are contiguous to one another and also to the annular area covered by the bubbles from the liquid leaving the outer edges of the segments, indeed there may be come slight overlapping but it is not pronounced because the whole of the area—the annular area and the several segmental areas within it—is covered with market uniformity. This uniform distribution of the bubbles is highly effective in extinguishing the burning flammable liquid.

The size of the bubbles formed will depend upon a number of factors including the pressure of the water, the size of the projector throat and the length of the segmental sections of the distributor. Obviously all of the bubbles formed are not uniform in size, nor is their size critical except within wide limits. Thus, it will be appreciated that the great majority of the bubbles must not be so small as to be vaporized or carried away by convection currents before they reach the surface of the flammable liquid, nor should the majority of bubbles be so large that they will be broken up by air turbulence as they are projected toward said surface. Perhaps for some specific set of conditions there is a most advantageous bubble size but experiments have shown that for extinguishing burning flammable liquids of the kind ordinarily used the bubbles should not be greater than .125 inch nor less than .015 inch in diameter.

Equally as important as the size of the bubbles is the proportion of air to water therein. Thus a bubble may be relatively large in diameter but fail to reach the surface of the burning liquid because of its relatively large percentage of air. Such a bubble might be broken by the air turbulence as it leaves the projector, or be transformed into steam before it reaches the surface of the inflammable liquid, or be carried away by convection currents. On the other hand the bubbles must not have too little air therein or they will not float on a flammable liquid whose density is less than that of water. Thus taking into consideration the factors which limit the proportions of air to water in the bubbles they should not have more than .030% nor less than .006% by weight of air when projected onto flammable liquid.

It has been found that by far the greater part of the water issuing from a projector of the type shown in the drawings will be formed into bubbles of the proper size and with the proper percentage of included air to extinguish fires of the above-noted flammable liquids if the projector is located from two to ten feet above the liquid, has a throat outlet of from one-quarter to one-half inch in diameter and its deflector is disposed to give proper distribution over the area to be served. Discharge pressures from twenty pounds upward may be used.

An example of one arrangement that was found highly satisfactory is as follows (reference being hereinafter made to the drawings to illustrate dimensions):

A rectangular tank was used having a length A of 8 feet and a width B of 6 feet and having two nozzles disposed thereover. These nozzles, spaced apart by a distance C of 4 feet, were each located equidistant from the long sides of the tank, i. e. at a distance D of 3 feet from each such side, and each nozzle was further located at a distance E of 2 feet from the short side of the tank nearest to it. The nozzles were disposed at a distance F of 5½ feet above the surface of the flammable liquid which, in the test, was kerosene. The water pressure in the water supply pipes 24 was 25 pounds per square inch.

Figure 5:
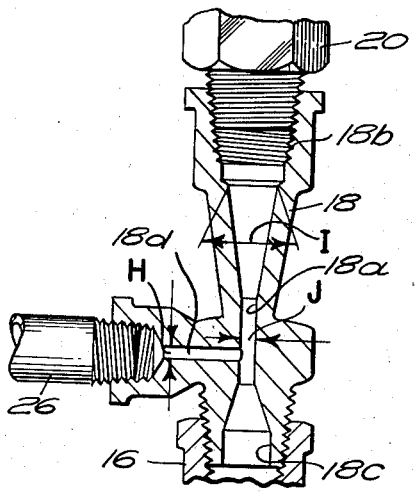
Figure 6:
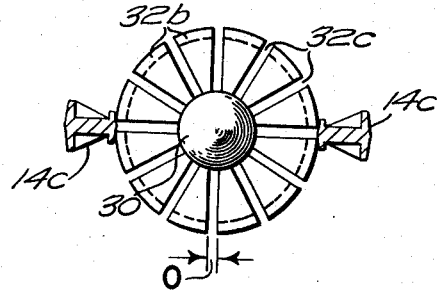

A surface tension reducing agent was drawn into the water by the Venturi action of a proportioning fitting 18 (see Fig. 5). The surface tension reducing agent used was "Ahcowet ANS" made by Arnold Hoffman & Co., Inc., of Providence, Rhode Island. This agent was led along a tube 26 and into the proportioning fitting 18 at a point located above the agent supply pipe 28 by a distance G of 3⅜ inches. The proportioning fitting itself had an agent inlet 18d of a diameter H equal to .125 inch. The diameter I at the top of the Venturi bore 18a and the diameter J at the inlet 18d were .638 inch and .190 inch, respectively.

The nozzle employed was similar to that shown in the drawings and had a tapered throat 14e with an outlet diameter K of ¼ of an inch. The conical transformer 30 had an angle L of 60° at its vertex while the deflector segments 32b were at an angle M of 133° with respect to the surface of the transformer. There were twelve of these segments 32b having a length N of 15/32 of an inch, and the spacings 32c between the segments had a dimension O of .056 inch. The overall deflector diameter P was 1⅜ inches. The vertex of the transformer cone was spaced a distance Q of 19/32 of an inch from the outlet of the nozzle throat 14e.

In the test example, after a vigorous fire was started and had been in progress for 1½ minutes, the discharge of the bubbles from the several nozzles was effected and the fire completely extinguished in 60 seconds.

In general the primary essential characteristic of a nozzle suitable for the formation of bubbles is that the liquid must be transformed thereby into a thin sheet before discharge into flight toward the fire to be extinguished.

The system herein illustrated and particularly described has been disclosed merely for the purpose of showing how the desired bubbles can be formed and projected onto the surface of a burning flammable liquid. It is to be understood however, that the present invention is not to be deemed limited by this showing because the bubbles could be provided by other means, as for example by a projector to which a hose line is connected and through which a mixture of water and a surface tension reducing agent is supplied. The essence of the present method is to provide a sufficient quantity of bubbles or air filled globules of water which float on the surface of the burning flammable liquid to permit the vaporization of their water and the consequent dilution of the flammable vapors to a point where the mixture of vapors cannot burn.

The present method of providing the necessary amount of water vapor is unlike the methods heretofore proposed which have involved the formation of emulsions at and just below the surface of the flammable liquid.

An emulsion is a mixture of two immiscible liquids, one being homogeneously suspended in the other in the form of tiny droplets. The inner liquid is designated as being in the internal or dispersed phase while the other liquid is designated as being in the outer or continuous phase. Such an emulsion may be formed by agitating water and oil to which a third component known as an emulsifying agent has been added. The type of emulsifying agent chosen will determine whether the water is to be in the dispersed or in the continuous phase. In the methods heretofore proposed which have employed such emulsions to extinguish fires of flammable liquids the necessary agitation has been achieved by the force of solid water particles striking the surface of the flammable liquid.

The purpose in forming an emulsion is to keep the water at or just below the surface of the flammable liquid so that it will be vaporized by the heat of the flames above. The purpose of the present method is not to form an emulsion but to form water bubbles which float on the surface of the flammable liquid without emulsifying action. The bubbles projected onto the surface of the flammable liquid cause little if any agitation thereof, because they are purposely projected with much less force than is essential in the emulsification method. If the surface tension reducing agent used in the present method happens also to be a fairly good emulsifying agent and a bubble should get into the flammable liquid the air in the bubble immediately causes the bubble to rise to the surface and float thereon before emulsification can occur. By thus providing the water at or above the surface of the flammable liquid—the greater part of the water film of the bubble is actually above the surface of the flammable liquid and in the zone of the flammable vapors—the water is not only more readily and quickly vaporized, since it is nearer the flames, but it mixes instantly with the flammable vapors about it.

The present improved method is also unlike those methods previously suggested which employ what has come to be known as a "foam" which floats on the surface of a flammable liquid. While possibly some of the "foam" material is vaporized by the heat of the flames it is purely an incidental happening not intended to dilute the flammable vapor. The sole purpose of the foam is to spread a non-burnable blanket over the flammable liquid so as to physically separate the flammable vapor from the combustion-supporting oxygen. In the present method the purpose is not to shut off the oxygen from the burning vapors by a blanket, but rather to provide a myriad of individual water bubbles which are rapidly vaporized by the heat of the flames and thus produce sufficient water vapor which when mixed with the flammable vapor (in the presence of the atmospheric oxygen), will promptly produce a resulting mixture of vapor too lean to burn. Thus the water bubbles must not only have the included air to make them float, as does the foam have included air to make it float, but in addition the bubbles must be non-cohesive and retain their individuality, two distinguishing characteristics not present in any of the so-called foams.

It has been found that such individuality and non-cohesive characteristics are best achieved when the bubbles have a low surface tension. This condition is brought about by the employment of the surface tension reducing agents hereinbefore noted. They not only reduce the surface tension of the water as the two are mixed in the proportioning device, but once the bubbles are formed and projected onto the surface of the flammable liquid they are not cohesive and will retain their individuality even when in contact with one another. As a result of their individuality a maximum water film is presented to the heat of the flames for evaporation, to enable the formation of the necessary volume of diluting water vapor to take place rapidly.

Very promptly after the bubbles reach the liquid surface, the water film is vaporized and mixes with the concentrated flammable vapor just above the surface. This layer or zone of vapor is not burning nor is it rendered burnable by the relatively slight quantity of air liberated from the bubbles upon the vaporization of the water film. On the contrary the water vapor produced has a volume 1600 times its liquid volume and is so very great in quantity that it dilutes the concentrated flammable vapor and produces a mixture of the two which will not burn even as it moves upward to where oxygen in the air is present. As a consequence the flames rapidly disappear and the fire is promptly extinguished.

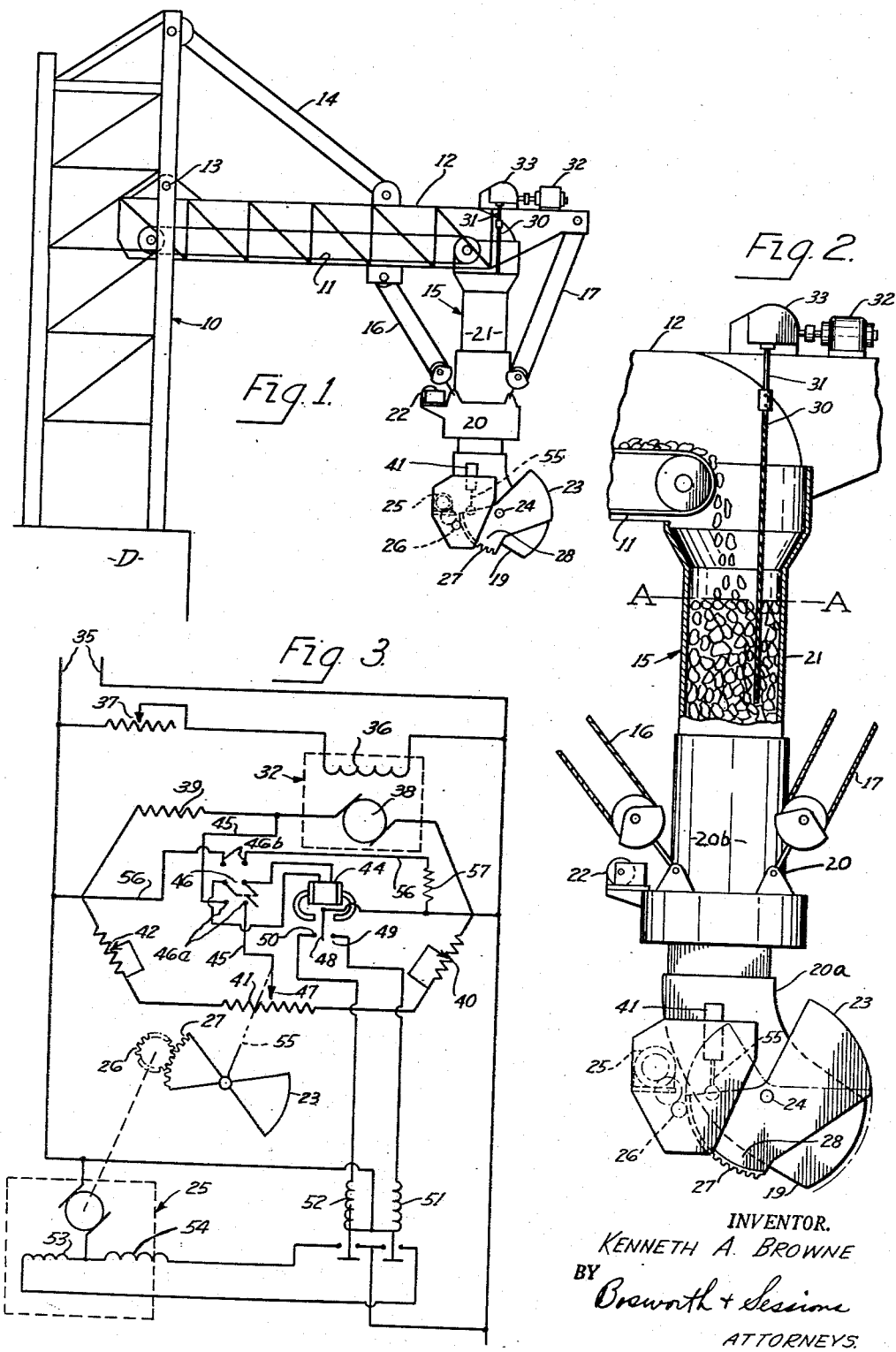

What is claimed is:

1. The method of extinguishing a burning vapor originating from a flammable liquid immiscible with water, which method comprises mixing a surface tension reducing agent with water, the mixture being predominantly water, projecting the mixture from a suitable globule-forming projector and forming a myriad of individual, non-cohesive air-filled globules of water and from a height above the surface of the flammable liquid dependent upon the pressure of the water supply and type of projector selected, directing a great preponderance of the globules through the flames onto the surface of the liquid without emulsifying agitation, said globules having a sufficiently high air content to float on the said surface and having a sufficiently high water concentration so that heat of combustion of the burning vapor vaporizes the water globules and the resulting water vapor from the globules mixes with and dilutes the burning vapor of the liquid to a point where the mixed vapors will not burn.

2. The method of extinguishing a burning vapor originating from a flammable liquid immiscible with water, which method comprises mixing a surface tension reducing agent with water, the mixture being predominantly water, projecting the mixture as a continuous stream toward the surface of the flammable liquid, transforming the said stream into continuously flowing thin films of liquid which in contact with the air change into a myriad of individual, air-filled noncohesive globules, directing said globules toward the surface of the flammable liquid with such force as to pass a great preponderance of the globules through the burning vapor onto the said surface without emulsifying agitation, whereat the said globules float to be subjected to the heat of combustion from the burning vapors and vaporized thereby forming water vapor of such quantity which when mixed with the flammable vapor forms a non-burnable mixture of vapors.

3. The method of extinguishing a burning vapor originating from a flammable liquid immiscible with water, which method comprises mixing a surface tension reducing agent with water, the mixture being predominantly water, continuously projecting the mixture as a solid stream toward the surface of the flammable liquid, transforming the said solid stream which consists solely of water and the surface tension reducing agent into thin continuously flowing films of liquid which in contact with the air change into a myriad of individual, air-filled, non-cohesive globules of diameters substantially in the range of from .015 inch to .125 inch, and having air therein present in percentages by weight substantially in the range of from .006 percent to .030 percent, directing said globules toward the surface of the flammable liquid with such force as to pass a great preponderance of the globules through the burning vapor onto the said surface without emulsifying agitation, whereat the said globules float to be subjected to the heat of combustion from the burning vapors and are vaporized thereby forming water vapor of sufficient quantity which when mixed with the flammable vapor forms a non-burnable mixture of the combined vapors.

References Cited in the file of this patent

UNITED STATES PATENTS

| Number | Name | Date |
| --- | --- | --- |
| 2,008,847 | Barclay | July 23, 1935 |
| 2,176,423 | Jaeger | Oct. 17, 1939 |
| 2,283,775 | Thompson | May 19, 1942 |
| 2,391,616 | Causer | Dec. 25, 1945 |
| 2,487,964 | Cranston | Nov. 15, 1949 |
| 2,492,037 | Freeman et al. | Dec. 20, 1949 |
| 2,495,208 | Causer | Jan. 24, 1950 |

OTHER REFERENCES

Page 104, "Demonstration Experiments in Physics" by Professor Richard M. Sutton, copy in parent application Serial No. 670,151.

Page 1170, "Chemical Engineers Handbook," 3rd edition, John H. Perry, copy in parent application Serial No. 670,151.